US010666400B2

(12) United States Patent
Kaikkonen et al.

(10) Patent No.: US 10,666,400 B2
(45) Date of Patent: May 26, 2020

(54) ENHANCING MONITORING OF MULTIPLE PHYSICAL DOWNLINK CONTROL CHANNELS IN BEAM BASED SYSTEM

(71) Applicant: Nokia Technologies Oy, Espoo (FI)

(72) Inventors: Jorma Kaikkonen, Oulu (FI); Sami-Jukka Hakola, Kempele (FI); Mihai Enescu, Espoo (FI)

(73) Assignee: Nokia Technologies Oy, Espoo (FI)

( * ) Notice: Subject to any disclaimer, the term of this patent is extended or adjusted under 35 U.S.C. 154(b) by 90 days.

(21) Appl. No.: 16/125,134

(22) Filed: Sep. 7, 2018

(65) Prior Publication Data

US 2019/0081740 A1 Mar. 14, 2019

Related U.S. Application Data

(60) Provisional application No. 62/556,776, filed on Sep. 11, 2017.

(51) Int. Cl.

| | |
|---|---|
| ***H04W 4/00*** | (2018.01) |
| ***H04L 1/18*** | (2006.01) |
| ***H04W 72/04*** | (2009.01) |
| ***H04L 5/00*** | (2006.01) |
| ***H04B 7/00*** | (2006.01) |

(52) U.S. Cl.

CPC ............. *H04L 1/1812* (2013.01); *H04B 7/00* (2013.01); *H04L 1/1854* (2013.01); *H04L 1/1861* (2013.01); *H04L 1/1887* (2013.01); *H04L 5/0055* (2013.01); *H04W 72/046* (2013.01); *H04W 72/0446* (2013.01); *H04L 5/0048* (2013.01); *H04W 72/042* (2013.01)

(58) Field of Classification Search

None

See application file for complete search history.

(56) References Cited

PUBLICATIONS

"3rd Generation Partnership Project; Technical Specification Group Radio Access Network; NR; Physical layer procedures for control (Release 15)", 3GPP TS 38.213, V0.0.3, Aug. 2017, pp. 1-16.

"3rd Generation Partnership Project; Technical Specification Group Radio Access Network; NR; Radio Resource Control (RRC); Protocol specification (Release 15)", 3GPP TS 38.331, V0.0.5, Aug. 2017, pp. 1-38.

*Primary Examiner* — Phuongchau Ba Nguyen

(74) *Attorney, Agent, or Firm* — Nokia Technologies Oy

(57) ABSTRACT

In accordance with an example embodiment, there is disclosed a method comprising: transmitting a first downlink channel via a primary beam within n slots, wherein n is a time between the transmission of an uplink control channel carrying HARQ information corresponding to the first downlink channel transmitted via the primary beam and a next time instance that a second downlink channel is configured be monitored from a secondary beam; receiving HARQ feedback within m slots calculated from a slot number configured to monitor the second downlink channel on at least one secondary beam, wherein m is time between a scheduled downlink channel and a next downlink channel monitoring instance via the secondary beam; and in response to receiving the HARQ feedback, ignoring a monitored downlink channel pattern and scheduling at least one user device using the primary beam on the slot number configured to monitor the second downlink channel on the at least one secondary beam.

20 Claims, 5 Drawing Sheets

400
405
415
420
gNB beam
UE beam
410
Primary BPL
430
Secondary BPL
gNB 170
UE 110
1
RRC: Configures time domain monitoring pattern for PDCCHs, N and M
435
440
Monitoring time slot of primary PDCCH beam 450
MAC: Configures spatial QCL association between RSs and DMRSs of PDCCHs
Monitoring time slot of secondary PDCCH beam 460
2
415
440
3
460
NR-PDCCH: DCI schedules NR-PDSCH and HARQ feedback resource
450
UE detects successfully NR-PDCCH and calculates n as time between current slot and next slot configured for monitoring PDCCH from secondary beam
4
UE calculates m as time between slot where PUCCH is to be transmitted and next slot configured for monitoring PDCCH from secondary beam
5
UE determines whether both n<=N and m<=M. If that holds, the UE will monitor NR-PDCCH assuming the same beam as used for detected NR-PDCCH also in the next slot configured for monitoring PDCCH from secondary beam.
6
7
NR-PDCCH: DCI schedules NR-PDSCH and HARQ feedback resource
NR-PDCCH: DCI schedules NR-PDSCH and HARQ feedback resource
Changed monitoring PDCCH beam
470
8
420

ENHANCING MONITORING OF MULTIPLE PHYSICAL DOWNLINK CONTROL CHANNELS IN BEAM BASED SYSTEM

TECHNICAL FIELD

The teachings in accordance with the exemplary embodiments of this invention relate generally to new radio (NR) physical layer design, and particularly, to downlink control channel transmission and reception.

BACKGROUND

In implementations of new radio, operation at higher carrier frequencies (for example, above 6 GHz) may require higher array/antenna gains than operations at lower carrier frequencies. Consequently, both gNBs and UEs may be required to use more narrow RF beam patterns than sector wide beam at gNB and omni-directional beam at UE. Together with wider bandwidths at higher carrier frequencies may lead to use of analog and hybrid beamforming architectures and consequently non-frequency selective beamforming and TDM multiplexing between utilized beams. With regard to the UE side of NR radio operations, there may be a constraint that the UE is able to receive only from one or limited number of "beam direction" at a time depending on the UE's capability (for example, number of panels and number of transceiver units (TXRUs) of the UE).

To provide robustness against blockages, the UE may be configured to monitor NR-PDCCH on different beam pair links in different NR-PDCCH symbols where a beam pair link may be considered as a UE measurement on a reference signal received according to RX spatial filtering configuration. In other words, the beam pair link may capture both transmission (TX) beam at gNB and RX beam at a UE.

Certain abbreviations that may be found in the description and/or in the Figures are herewith defined as follows:

ACK Acknowledgement
BPL Beam Pair Link
CE Control Element
CQI Channel quality indicator
CSI Channel status information
DCI Downlink Control Information
DL Downlink
DMRS Demodulation Reference Signal
gNB 5G Enhanced Node B (Base station)
HARQ Hybrid Automatic Repeat Request
LTE long term evolution
MAC Medium access control
MEC multi-access edge computing
MME mobility management entity
NACK Negative acknowledgement
NCE network control element
NR New radio
NR-PDCCH New radio Physical Downlink Control Channel
NAY Network
OFDM Orthogonal Frequency Division Multiplexing
PDCCH Physical Downlink Control Channel
PDSCH Physical Downlink Shared Channel
PUCCH Physical Uplink Control Channel
PUSCH Physical Uplink Shared Channel
QCL Quasi Co-Locator
RE Resource Element
RF Radio Frequency
RRC Radio Resource Control
RS Reference Signal
RSRP Reference Signal Received Power
SS Signal Strength
TXRU Transceiver Unit
UE User Equipment
UL Uplink
5G Fifth generation mobile communication system

SUMMARY

Various aspects of examples of the invention are set out in the claims.

According to a first aspect of the present invention, an apparatus comprising at least one processor and at least one memory including computer program code, wherein the at least one memory and the computer code are configured to, with the at least one processor, cause the apparatus to at least: transmitting a first downlink channel via a primary beam within n slots, wherein n is a time between the transmission of an uplink control channel carrying HARQ information corresponding to the first downlink channel transmitted via the primary beam and a next time instance that a second downlink channel is configured be monitored from a secondary beam; receiving HARQ feedback within m slots calculated from a slot number configured to monitor the second downlink channel on at least one secondary beam, wherein m is time between a scheduled downlink channel and a next downlink channel monitoring instance via the secondary beam; and in response to receiving the HARQ feedback, ignoring a monitored downlink channel pattern and scheduling at least one user device using the primary beam on the slot number configured to monitor the second downlink channel on the at least one secondary beam.

According to a second aspect of the present invention, a method comprising: transmitting a first downlink channel via a primary beam within n slots, wherein n is a time between the transmission of an uplink control channel carrying HARQ information corresponding to the first downlink channel transmitted via the primary beam and a next time instance that a second downlink channel is configured be monitored from a secondary beam; receiving HARQ feedback within m slots calculated from a slot number configured to monitor the second downlink channel on at least one secondary beam, wherein m is time between a scheduled downlink channel and a next downlink channel monitoring instance via the secondary beam; and in response to receiving the HARQ feedback, ignoring a monitored downlink channel pattern and scheduling at least one user device using the primary beam on the slot number configured to monitor the second downlink channel on the at least one secondary beam.

According to a third aspect of the present invention, a non-transitory computer readable medium encoded with instructions that, when executed by a computer, cause performance of a method comprising: transmitting a first downlink channel via a primary beam within n slots, wherein n is a time between the transmission of an uplink control channel carrying HARQ information corresponding to the first downlink channel transmitted via the primary beam and a next time instance that a second downlink channel is configured be monitored from a secondary beam; receiving HARQ feedback within m slots calculated from a slot number configured to monitor the second downlink channel on at least one secondary beam, wherein m is time between a scheduled downlink channel and a next downlink channel monitoring instance via the secondary beam; and in response to receiving the HARQ feedback, ignoring a monitored downlink channel pattern and scheduling at least one user device using the primary beam on the slot number configured to monitor the second downlink channel on the at least one secondary beam.

According to a fourth aspect of the present invention, an apparatus comprising at least one processor and at least one memory including computer program code, wherein the at least one memory and the computer code are configured to, with the at least one processor, cause the apparatus to at least: detect a first downlink channel and calculate n as a time between a current slot and a next slot configured for monitoring a second downlink channel from a secondary beam; calculate m as time between a slot where an uplink channel is to be transmitted and the next slot configured for monitoring the second downlink channel from the secondary beam; and determine whether both m less than or equal to M and n is less than or equal to N and if both conditions hold, monitor the first downlink channel based on an assumption that a same beam used for the detected first downlink channel is also in the next slot configured for monitoring the second downlink channel from the secondary beam, wherein M is a maximum time between transmission of the first downlink channel transmitted via a primary beam and a next time instance the second downlink channel is to be monitored from the secondary beam and N is a maximum time between transmission of the uplink channel carrying Hybrid Automatic Repeat Request (HARQ) acknowledgment/non-acknowledgment (ACK/NACK) corresponding to the first downlink channel transmitted via the primary beam and the next time instance the second downlink channel is to be monitored from the secondary beam.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

In the example embodiments as described herein a method and apparatus that provides multi-beam downlink channel control procedures.

Figure 1:
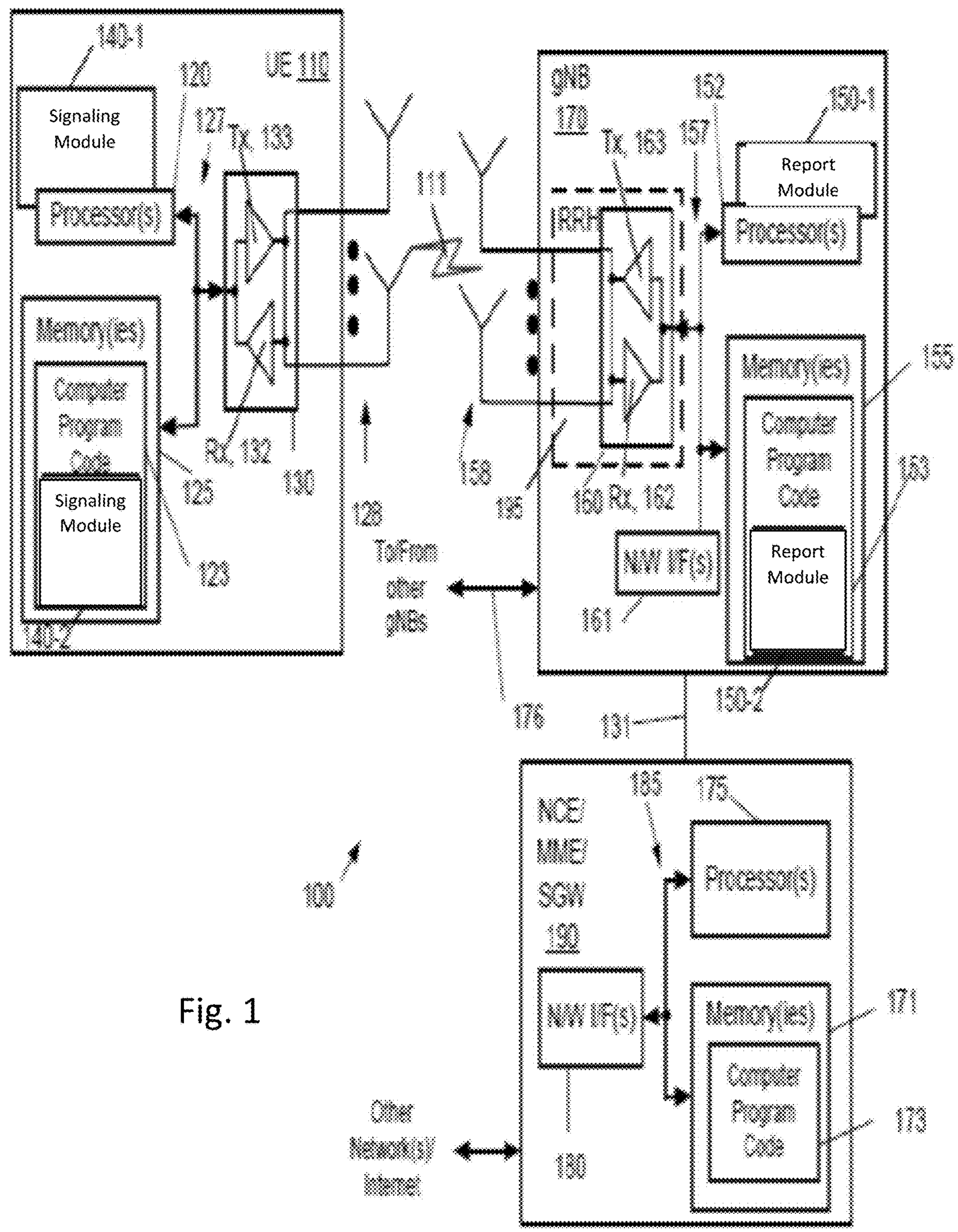
FIG. 1 is a block diagram of one possible and non-limiting example system in which the example embodiments may be practiced.

Turning to FIG. 1, this figure shows a block diagram of one possible and non-limiting example system in which the example embodiments may be practiced. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a signaling module 140, comprising one of or both parts 140-1 and/or 140-2, which may be implemented in a number of ways. The signaling module 140 may be implemented in hardware as signaling module 140-1, such as being implemented as part of the one or more processors 120. The signaling module 140-1 may be implemented also as an integrated circuit or through other hardware such as a programmable gate array. In another example, the signaling module 140 may be implemented as signaling module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with eNB 170 via a wireless link 111.

The gNB (NR/5G Node B but possibly an evolved NodeB) 170 is a base station (e.g., for LTE, long term evolution) that provides access by wireless devices such as the UE 110 to the wireless network 100. The gNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The gNB 170 includes a report module 150, comprising one of or both parts 150-1 and/or 150-2, which may be implemented in a number of ways. The report module 150 may be implemented in hardware as report module 150-1, such as being implemented as part of the one or more processors 152. The report module 150-1 may be implemented also as an integrated circuit or through other hardware such as a programmable gate array. In another example, the report module 150 may be implemented as report module 150-2, which is implemented as computer program code 153 and is executed by the one or more processors 152. For instance, the one or more memories 155 and the computer program code 153 are configured to, with the one or more processors 152, cause the gNB 170 to perform one or more of the operations as described herein. The one or more network interfaces 161 communicate over a network such as via the links 176 and 131. Two or more gNBs 170 communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the gNB 170 being physically in a different location from the RRH, and the one or more buses 157 could be implemented in part as fiber optic cable to connect the other elements of the gNB 170 to the RRH 195.

It is noted that description herein indicates that “cells” perform functions, but it should be clear that the gNB that forms the cell will perform the functions. The cell makes up part of a gNB. That is, there can be multiple cells per gNB.

The wireless network 100 may include a network control element (NCE) 190 that may include MME (Mobility Management Entity)/SGW (Serving Gateway) functionality, and which provides connectivity with a further network, such as a telephone network and/or a data communications network (e.g., the Internet). The gNB 170 is coupled via a link 131 to the NCE 190. The link 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, gNB 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Embodiments herein may be implemented in software (executed by one or more processors), hardware (e.g., an application specific integrated circuit), or a combination of software and hardware. In an example of an embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium or other device that may be any media or means that can contain or store the instructions for use by or in connection with an instruction execution system, apparatus, or device, such as a computer.

The current architecture in LTE networks is fully distributed in the radio and fully centralized in the core network. The low latency requires bringing the content close to the radio which leads to local break out and multi-access edge computing (MEC). 5G may use edge cloud and local cloud architecture. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services and augmented reality. In radio communications, using edge cloud may mean node operations to be carried out, at least partly, in a server, host or node operationally coupled to a remote radio head or base station comprising radio parts. It is also possible that node operations will be distributed among a plurality of servers, nodes or hosts. It should also be understood that the distribution of labor between core network operations and base station operations may differ from that of the LTE or even be non-existent. Some other technology advancements probably to be used are Software-Defined Networking (SDN), Big Data, and all-IP, which may change the way networks are being constructed and managed.

Having thus introduced one suitable but non-limiting technical context for the practice of the example embodiments of this invention, the example embodiments will now be described with greater specificity.

Figure 2:
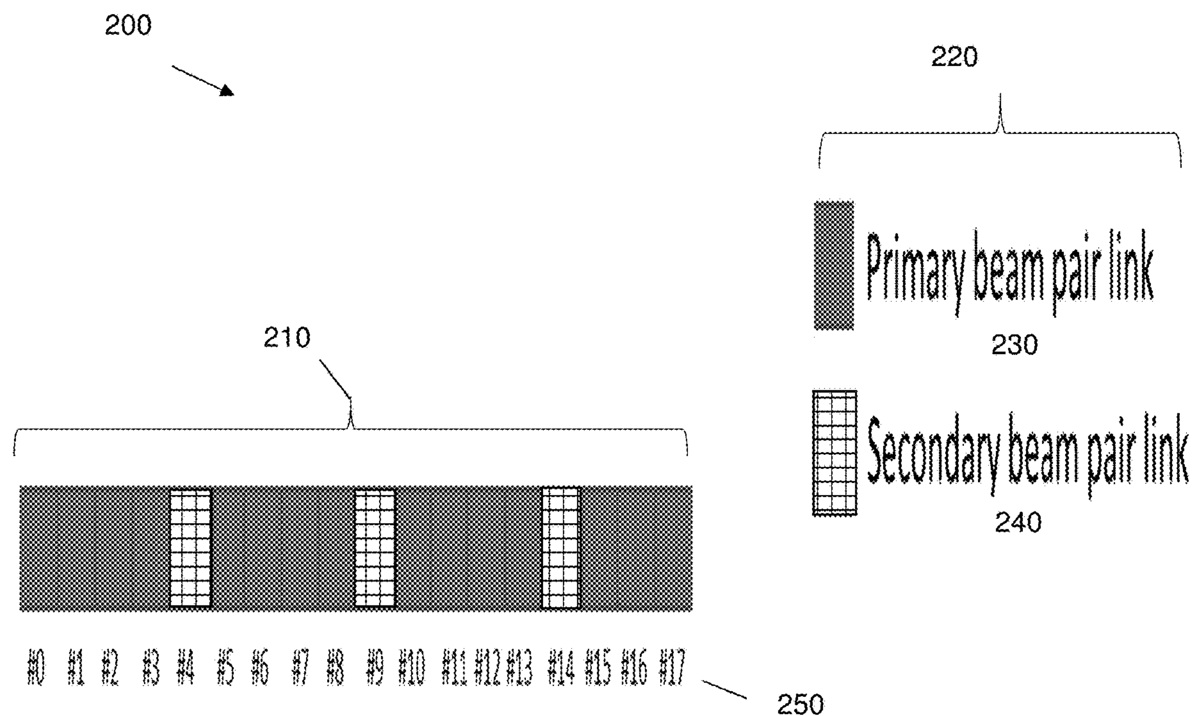
FIG. 2 shows an example illustration of time domain monitoring configuration for multiple NR-PDCCHs.

FIG. 2 illustrates a time domain monitoring configuration 200 for multiple NR-PDCCHs. The time domain monitoring configuration 200 includes time domain slots 210 and a BPL key 220. BPL key 220 is defined by a UE 110 or gNB 170 measurement (for example, RSRP/CSI) on a reference signal (for example, CSI-RS, SS, SRS) transmitted/received according to a TX/RX spatial filtering configuration, and may characterize a primary beam pair link 230, illustrated by time slots with a solid fill and a secondary beam pair link 240, illustrated by time slots with a cross lined pattern.

As shown in FIG. 2, when UE 110 is configured to monitor multiple PDCCH (for example, NR-PDCCH), the UE 1110 may be configured with a time domain pattern indicating when NR-PDCCH may be transmitted using particular BPL. This may assist UE 110 to set its RX beam properly. For instance, UE 110 may be configured to have two BPLs for NR-PDCCH monitoring. One may be applied on slots fulfilling condition mod (modulo operation) (# slot, 5)≠0 (for example, not equal to 0) and the other may be applied on slots fulfilling condition mod (# slot, 5)=0 (for example, equal to 0). In instances in which the condition mod is based on the slot number being not equal to a particular number (for example, 5), UE 110 may monitor BPL for slots corresponding to slot numbers that are not determined from the particular number. In other words, in slots that are not (derived from) slot 5 (for example, in slots #1, #2, #3, #4, #6, #7, #8, #9, #11), UE 110 may monitor BPL. In instances in which mod (slot_number, 5) equals to zero, slots that fulfill this are 0, 5, 10, 15, 20. In this example UE 110 may monitor a "primary" link 4/5 of the time and a "secondary" link 1/5 of the time, as also illustrated in FIG. 2.

In instances in which a UE 110 is configured to always follow the configured time pattern and data is required to be transmitted according to configured time domain pattern for NR-PDCCH monitoring, optimal capacity/throughput may not be achieved. The secondary link may be a backup link operated using a wider beam with less array gain at gNB 170, and even at UE 110, whereas the primary link may be operated using a very narrow beam at gNB 170, and at UE 110, to achieve a (relatively) high array gain (for example, with respect to the secondary link) In some instances, the primary and secondary beams may not prefer any prioritization and may be referred to (or processed, accessed, etc.) as a first beam and a second beam, or one or another.

This configuration conforms to agreements from RAN1 (Radio Layer 1), standards specifications group as described in 3GPP ad-hoc meeting hosted in Spokane, U.S. 2017. NR-PDCCH transmission may support robustness against beam pair link blocking. UE 110 may be configured to monitor NR-PDCCH on M beam pair links simultaneously, in which M≥1. Maximum value of M may depend at least on UE 110 capability. The monitored NR-PDCCH is done by monitoring the so called CORESET which consists of search space resources containing control channel information for the target user. The M beam pair links may have different or same CORESET. In some instances, UE 110 may select at least one beam out of M for NR-PDCCH reception.

UE 110 may be configured to monitor NR-PDCCH on different beam pair link(s) in different NR-PDCCH orthogonal frequency division multiplexing (OFDM) symbols. In some instances, NR-PDCCH on one beam pair link may be monitored with shorter duty cycle than other beam pair link(s) In some instances, the systems may be implemented with time granularity of configuration, for example, slot level configuration, symbol level configuration. This configuration may apply to scenarios in which UE 110 may not have multiple RF chains. Monitoring NR-PDCCH on beam pair link(s) may be further defined based on agreements provided by RAN1.

Parameters related to UE Rx beam setting for monitoring NR-PDCCH on multiple beam pair links may be configured by higher layer signaling or medium access control (MAC) control element (CE) and/or considered in the search space design of the system. In some instance, the system may be designed to support both higher layer signaling and MAC CE.

Parameters related to UE 110 Rx beam setting for monitoring NR-PDCCH on multiple beam pair links may be configured by higher layer signaling (RRC) or MAC CE and/or used as factors in the search space design. Minimally, in some systems, NR may support indication of spatial QCL definition (for example, assumption) between DL RS antenna port(s), and DL RS antenna port(s) for demodulation of DL control channel. Time domain monitoring pattern may be defined (for example, assumed) to be configured in RRC and mapping beams (for example, primary and secondary) per time instant (for example, QCL association between DL RS and DMRS of PDCCH) in MAC-CE.

The methods and embodiments may improve the DL data rate, in case a second beam pair link has significant worse link budget compared to the first beam pair link. The systems may stay with the best beam pair link in case there had been lately a successful HARQ acknowledgement for this beam pair link.

Figure 3:
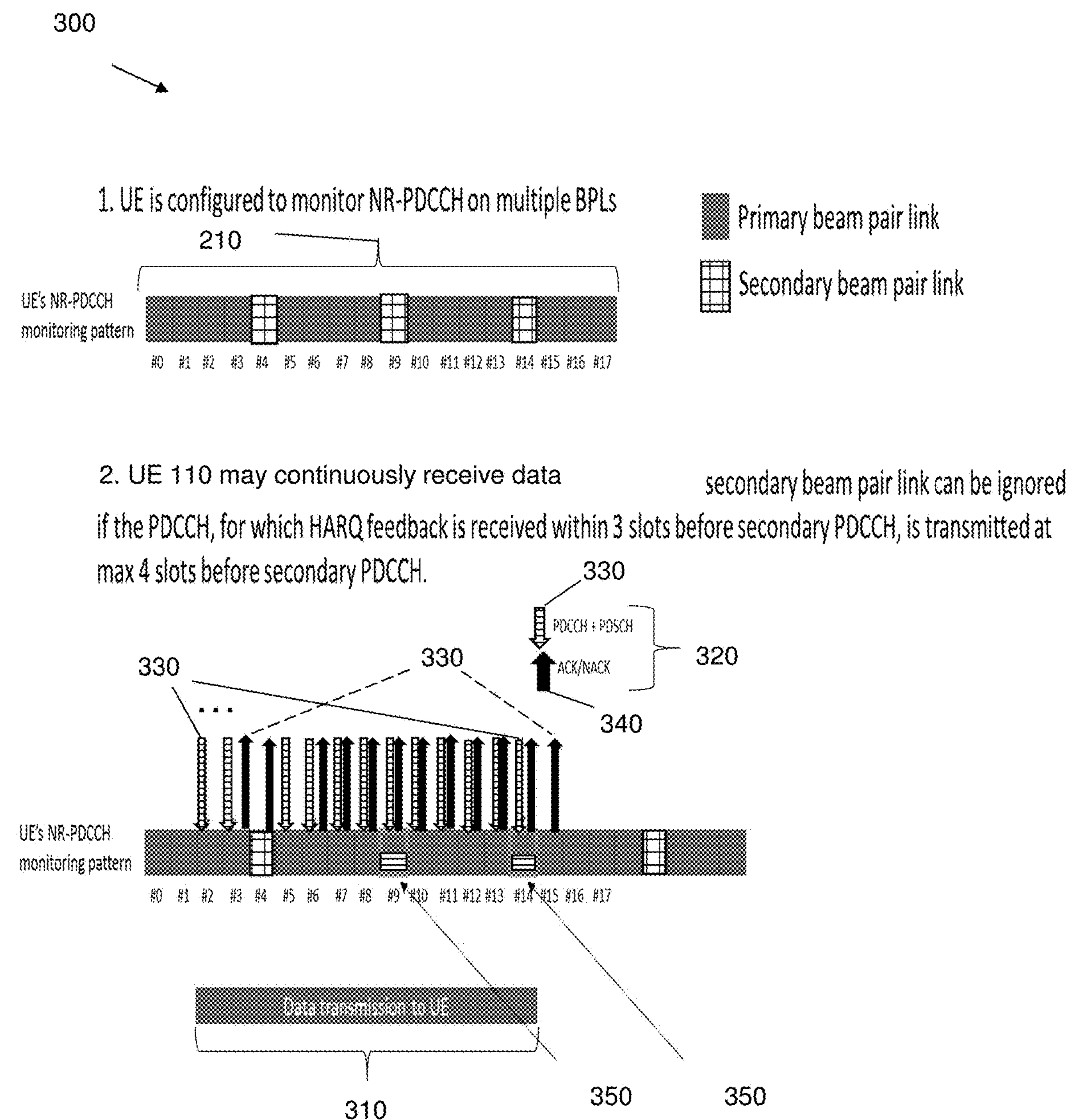
FIG. 3 shows an example illustration of a monitoring pattern for NR-PDCCH on multiple BPLs.

Referring to FIG. 3 an example an example illustration of a monitoring pattern for NR-PDCCH on multiple BPLs. Step 1 of the monitoring may include a time domain monitoring configuration 200, such as shown in FIG. 2, hereinabove, which may include time domain slots 210 and a BPL key 220. Step 2 of the monitoring may include continuous data transmission 310 to the UE 110 and PDCCH and PDSCH 330 with corresponding ACK/NACK 340, denoted in FIG. 3 by key 320.

As shown in FIG. 3, step 2, UE 110 continuously receives data (over the time span denoted by 310). The UE 110 may be configured by gNB 170 (or the network) to ignore the secondary beam pair link if the PDCCH, for which HARQ feedback is received within a predetermined number of slots (for example, 3 slots) before secondary PDCCH, is transmitted at a maximum predetermined number of slots (for example, 4 slots) before secondary PDCCH. UE may monitor the first beam pair link instead for a certain time period (for example, based on slots or another form of timer) regardless of the configured pattern. gNB 170 and UE 110 may implement processes to enable gNB 170 to use an optimal beam pair link for the data transmission to the UE 110 irrespective of the NR-PDCCH monitoring pattern configured to the UE 110 when the predefined conditions are fulfilled. The processes may be directed to both DL and UL allocations.

The systems and methods may provide a relationship between HARQ feedback timing and monitoring pattern. In instances in which gNB 170 transmits NR-PDCCH (+NR-PDSCH) via primary BPL 230 within a predetermined number of slots (for example, arbitrary constant n slots) and HARQ feedback is received within a predetermined number of slots (for example, arbitrary constant m slots) calculated from the slot number configured to monitor NR-PDCCH on a different BPL, the gNB 170 may ignore the monitored NR-PDCCH pattern and may schedule UE 110 using primary BPL 230 on that slot. This may be applied for both new transmission and retransmission (NACK 340 received from UE 110). The time to ignore second (secondary) beam (based on selected activity on first beam) may also be timer based, for example, if scheduled on first the timer may be implemented to keep monitoring for a predetermined time (for example, x ms, where x is a predefined number of milliseconds).

UE 110 may be configured to monitor NR-PDCCH on multiple BPLs. The UE 110 may continuously receive transmitted data (for example, a download (DL) of data). In some instances, secondary beam pair link 240 may be ignored if the PDCCH, for which HARQ feedback is received within a predetermined number of slots (for example, 3 slots) before secondary PDCCH, is transmitted at a predetermined maximum number of slots (for example, 4 slots) before secondary PDCCH. As shown at slots 9 and 14 in step 2 of FIG. 3, conditions may be fulfilled and the secondary beam may be ignored (indicated by 350 in FIG. 3) during continuous data transmission. In instances in which the secondary beam is ignored, the UE 110 may receive data on the primary beam and do nothing with respect to the secondary beam According to another example embodiment, for uplink data allocations, in instances in which gNB 170 transmits NR-PDCCH via primary BPL to schedule NR-PUSCH within a predefined number of slots (for example, p slots) and transmit HARQ feedback (DCI including new data indicator or retransmission) within another predefined number of slots (for example, r slots) calculated from the slot number configured to monitor NR-PDCCH on a different BPL, the gNB 170 may ignore the monitored NR-PDCCH pattern and may transmit NR-PDCCH to UE 110 using primary BPL 230 on that slot. p is a time between the NR-PDCCH scheduling NR-PUSCH and the next NR-PDCCH monitoring instance via secondary beam. r is time between the transmission NR-PDCCH HARQ ACK or NACK for allocated NR-PUSCH and the next time instance the NR-PDCCH should be monitored from the secondary beam. For uplink allocation, if both $p \le P$ and $r \le R$ hold, the UE 110 may ignore the configured time domain monitoring pattern for the next time instance of NR-PDCCH monitoring via secondary beam.

According to another example embodiment, NR-PDCCH for both downlink and uplink allocation may include an indicator(s) to ignore the configured monitoring pattern. UE 110 may be configured via RRC (for example, to implement the period of ignoring the configured monitoring pattern) to start (the period of ignoring) from the reception time of indicator. The indicator may come into effect (for example, be confirmed) when HARQ ACK/NACK feedback is transmitted (UE 110 for DL data, gNB 170 for UL data). In other words, an activation of the period of ignoring begins at the reception time of the indicator. This is based on HARQ confirmation from UE 110 that indication was received correctly. When indication is transmitted in PDCCH both ACK and NACK may confirm indication because UE 110 may send ACK or NACK when PDCCH is received correctly. Alternatively, in downlink allocation, information may be carried in MAC-CE (DCI content/length may not affect the transmission/be required to be changed).

In a further example, PDCCH DCI (for both downlink and uplink allocation, or DCI without data channel allocation) may provide temporary spatial quasi co-locator or quasi co-located (QCL) mapping between DL RSs and DMRS of PDCCH of particular time instant overriding the higher layer configured spatial QCL mapping for the particular period of time. A period of time may be predetermined (for example, provide in specification) or signalled as part of DCI (command) In other words, in one alternative, PDCCH DCI may map, for example, primary beam, to the slot(s) that the higher layers have configured for a secondary beam (denoted as slots 350, illustrated as slots numbered 9 and 14 in FIG. 3) for the particular period of time for PDCCH monitoring.

In a further example, based on selected activity on first beam, UE 110 may be instructed to apply reduced monitoring cycle for second beam for a certain time period (for example, Z ms, number of cycles, where Z is a predefined number of milliseconds). This may be also in combination with ignoring so that first the second beam is ignored (for example, for x ms), and then resumed with reduced cycle (until after the time that the normal cycle is resumed and the reduced monitoring cycle is discontinued).

In a further example embodiment, if the second beam is associated with common search space, or other higher priority monitoring, UE 110 is not assumed to ignore it.

In a further example embodiment, different mechanism may be applied to different beams based on some prioritization between beams, like noted above (for example, priority levels may include 1-prio: never ignore, 2-prio: reduce monitoring pattern cycle/period, 3-prio: ignore, etc.).

According to an example embodiment, instructions for ignoring monitoring pattern due to UL allocations may be associated to UE 110's buffer status report. For example, in instances in which UE 110 has large amount of data in the buffer, the aforementioned processes (including ignoring monitoring pattern) may be implemented. In instances in which UE 110 has low amount of data in the buffer, monitoring pattern may be retained (related to UL allocations). gNB 170 is configured to ignore based on an amount of data in a buffer of UE 110 exceeding a predetermined threshold.

Figure 4:
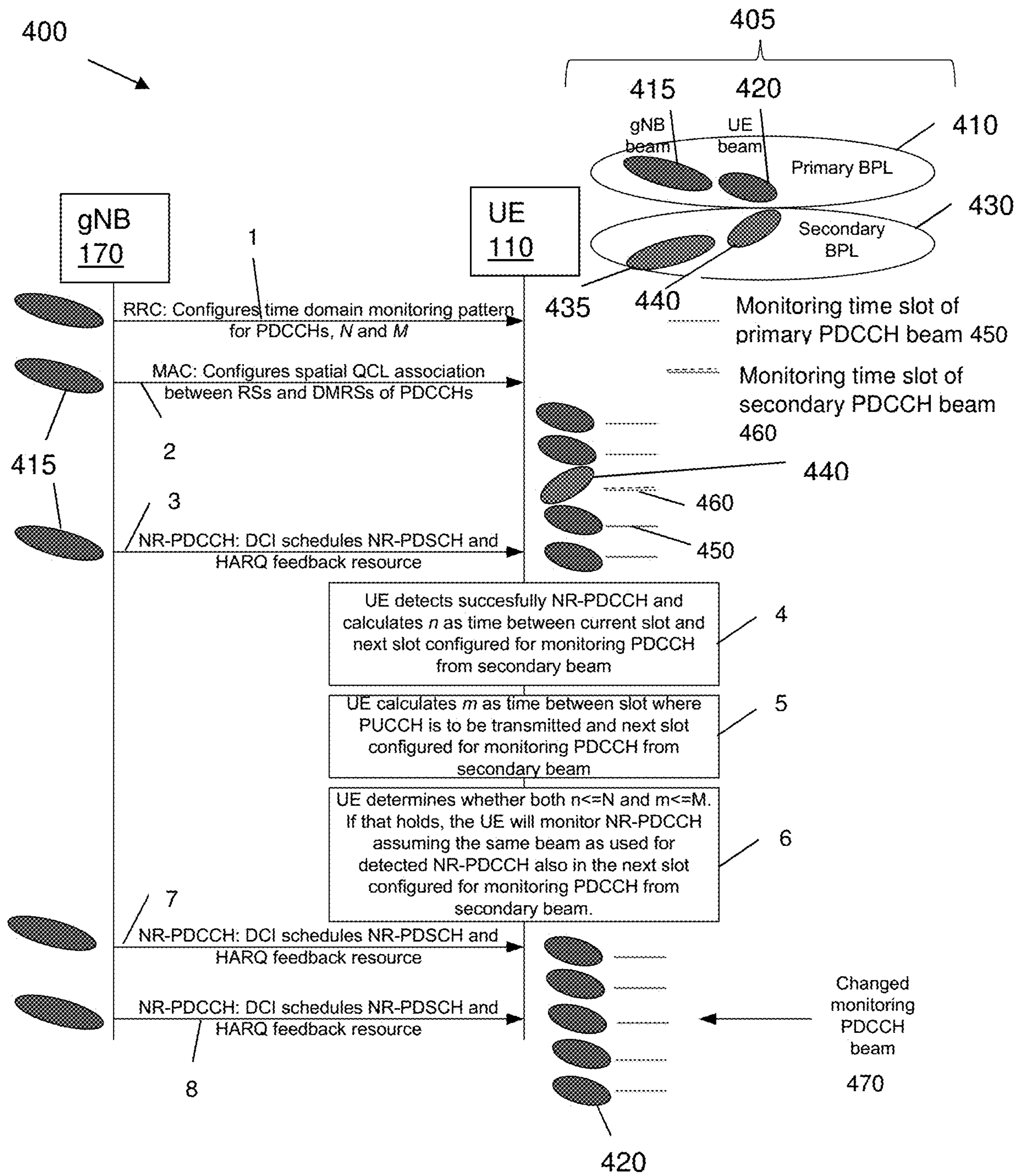
FIG. 4 shows an example sequence diagram implementing a monitoring pattern for NR-PDCCH on multiple BPLs.

FIG. 4 shows an example sequence diagram 400 implementing a monitoring pattern for NR-PDCCH on multiple BPLs. The example sequence diagram 400 includes a key 405.

Key 405 indicates a primary beam pair link 410, and a secondary beam pair link 430. The primary beam pair link 410 includes a gNB beam 415 (illustrated in FIG. 4 by a long oblong tilted to the left) and a UE beam 420 (illustrated in FIG. 4 by a shorter oblong tilted to the left). The secondary beam pair link includes a gNB beam 435 (illustrated in FIG. 4 by a long oblong tilted to the right) and a UE beam 440 (illustrated in FIG. 4 by a shorter oblong tilted to the right). Key 405 also indicates that the monitoring time slot of primary PDCCH beam 450 is illustrated by a solid horizontal line and the monitoring time slot of secondary PDCCH beam 460 is illustrated by a broken horizontal line.

UE 110 may be configured with RSs that are associated with respect to spatial domain parameters (for example, angle of arrival in azimuth and zenith at gNB 170) with DMRS of NR-PDCCHs. In other words RSs represent gNB 170 beams that are used for NR-PDCCH transmissions. Furthermore, the UE 110 may be configured with time domain pattern for NR-PDCCH beam monitoring so that the UE 110 may set its RX beam properly per NR-PDCCH detection instance.

The UE 110 may be configured with parameters (which may also be defined in specifications) M and N where M stands for the maximum time between the transmission of the NR-PDCCH transmitted via "primary" beam and the next time instance the NR-PDCCH is configured to (should) be monitored from the "secondary" beam, and N stands for the maximum time between the transmission of UL PUCCH carrying HARQ ACK/NACK corresponding to the NR-PDCCH transmitted via "primary beam and the next time instance the NR-PDCCH is to be monitored from the "secondary" beam.

For uplink data allocations, the UE 110 may be configured with parameters P and R, where P stands for the maximum time between the transmission of the NR-PDCCH to schedule NR-PUSCH transmitted via "primary" beam and the next time instance the NR-PDCCH should be monitored from the "secondary" beam, and R stands for the maximum time between the transmission NR-PDCCH HARQ ACK or NACK corresponding NR-PUSCH allocation that was scheduled using NR-PDSCH transmitted via "primary beam and the next time instance the NR-PDCCH should be monitored from the "secondary" beam.

UE procedure may include, in instances in which both $m \le M$ (where m is time between the scheduled NR-PDCCH and the next NR-PDCCH monitoring instance via secondary beam) and $n \le N$ (where n is time between the transmission of UL PUCCH carrying HARQ ACK/NACK corresponding to the NR-PDCCH transmitted via "primary beam and the next time instance the NR-PDCCH should be monitored from the "secondary" beam) hold, the UE 110 may ignore the configured time domain monitoring pattern for the next time instance of NR-PDCCH monitoring via secondary beam.

As shown in FIG. 4, steps 1-7 in the sequence diagram represent functionality of the methods and processes of multi-beam downlink channel control. Although not shown in FIG. 4, the processes may also include PUCCH HARQ ACK/NACK transmissions. The processes are further described herein below with respect to FIG. 5.

The system may be configured to provide some time margin for the gNB 170 to adapt its scheduling decisions. For example, there may be some margin between time received PUCCH HARQ ACK/NACK from UE 110 and the time instance at which the possible monitoring pattern change may happen. In these instances, the parameter N may have maximum and minimum value between which the calculated n is to be set in order to change the priori configured time domain monitoring pattern. For example, the UE 110 may be configured with an $N_{max}$ and $N_{min}$ and n may be required to be $N_{min} \leq n = N_{max}$ in order to fulfil the condition for n.

For uplink allocation, if both p≤P (where p is time between the NR-PDCCH scheduling NR-PUSCH and the next NR-PDCCH monitoring instance via secondary beam) and r≤R (where r is time between the transmission NR-PDCCH HARQ ACK or NACK for allocated NR-PUSCH and the next time instance the NR-PDCCH should be monitored from the "secondary" beam) hold, the UE 110 may ignore the configured time domain monitoring pattern for the next time instance of NR-PDCCH monitoring via secondary beam. In these instances, the UE 110 may be scheduled PDSCH or PUSCH via secondary beam.

Figure 5:
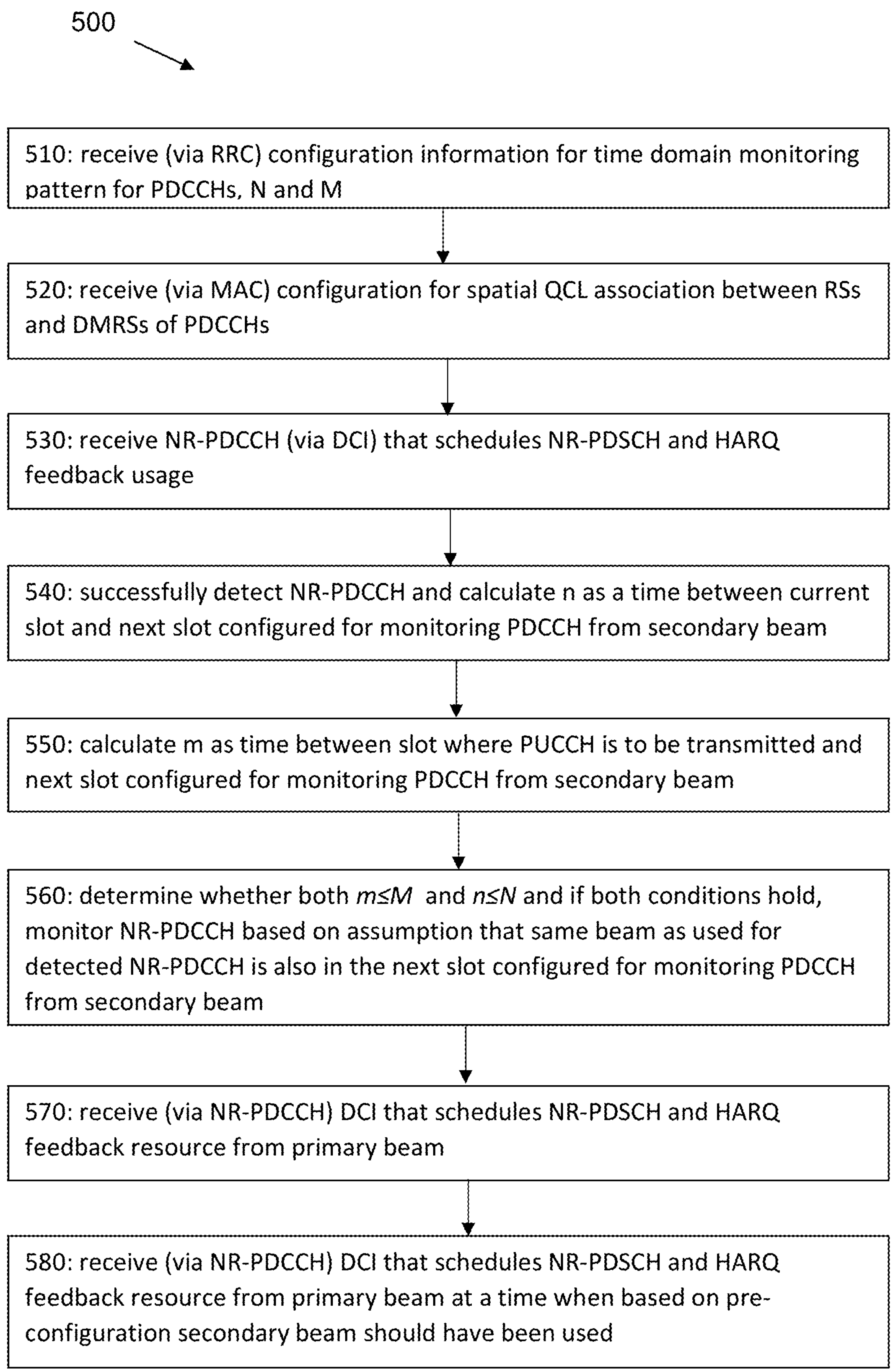
FIG. 5 shows a method in accordance with example embodiments which may be performed by an apparatus.

FIG. 5 is an example flow diagram 500 illustrating a process of monitoring of multiple physical downlink control channels in a beam based system.

At block 510, UE 110 may receive higher level (for example, via RRC or MAC) configuration information for time domain monitoring pattern for PDCCHs, N and M from gNB 170. UE 110 may thereafter be configured (or implement the configuration) for the time domain monitoring pattern.

At block 520, UE 110 may receive configuration (for example, be configured) for spatial QCL association between RSs and DMRSs of PDCCHs from gNB 170 via MAC.

At block 530, UE 110 may receive NR-PDCCH indicating upcoming PDSCH transmission characteristics. gNB 170 may send DCI that schedules NR-PDSCH and HARQ feedback usage. At this instant the monitoring pattern may include the UE beam 440 from the secondary BPL.

At block 540, UE 110 may successfully detect NR-PDCCH and calculate n as a time between current slot and next slot configured for monitoring PDCCH from secondary beam.

At block 550, UE 110 may calculate m as time between slot where PUCCH is to be transmitted and next slot configured for monitoring PDCCH from secondary beam.

At block 560, UE 110 may determine whether both m≤M and n≤N. If both conditions hold, UE 110 may monitor NR-PDCCH and may assume that the same beam as used for detected NR-PDCCH is also in the next slot pre-configured for monitoring PDCCH from secondary beam.

At block 570, UE 110 may receive from gNB 170 (for example, via NR-PDCCH) DCI that schedules NR-PDSCH and HARQ feedback resource.

At block 580, UE 110 may receive from gNB 170 (for example, via NR-PDCCH) DCI that schedules NR-PDSCH and HARQ feedback resource. In this instance the primary beam is used instead of the secondary beam (although based on pre-configuration it would have been secondary beam's turn prior to implementation of the processes described herein).

Without in any way limiting the scope, interpretation, or application of the claims appearing below, a technical effect of one or more of the example embodiments disclosed herein is that, when particular conditions are fulfilled, UE 110 may ignore the configured NR-PDCCH monitoring pattern. The example embodiments improve the DL data rate, in case a second beam pair link has significant worse link budget compared to the first beam pair link. For example, the example embodiment may stay with the best beam pair link in instances in which there had been lately a successful HARQ acknowledgement for this beam pair link.

An example embodiment may provide a method comprising transmitting, by a base station, a first downlink channel via a primary beam within n slots, wherein n is a time between the transmission of an uplink control channel carrying Hybrid Automatic Repeat Request (HARQ) information corresponding to the first downlink channel transmitted via the primary beam and a next time instance that a second downlink channel is configured be monitored from a secondary beam; receiving HARQ feedback within m slots calculated from a slot number configured to monitor the second downlink channel on at least one secondary beam, wherein m is time between a scheduled downlink channel and a next downlink channel monitoring instance via the secondary beam; and in response to receiving the HARQ feedback, ignoring a monitored downlink channel pattern and scheduling at least one user device using the primary beam on the slot number configured to monitor the second downlink channel on the at least one secondary beam.

In accordance with the example embodiments as described in the paragraphs above, wherein the transmitting comprises one of a new transmission and a retransmission.

In accordance with the example embodiments as described in the paragraphs above, wherein the at least one user device is configured to monitor PDCCH on a plurality of BPLs.

In accordance with the example embodiments as described in the paragraphs above, transmitting, by the base station, PDCCH via the primary BPL to schedule PUSCH within p slots, transmitting HARQ feedback within r slots calculated from a slot number configured to monitor PDCCH on the at least one secondary BPL; and in response to transmitting the HARQ feedback, ignoring the monitored PDCCH pattern and transmitting PDCCH to the at least one user device using the primary BPL on the slot number configured to monitor PDCCH on the at least one secondary BPL.

In accordance with the example embodiments as described in the paragraphs above, configuring, via an indictor transmitted by Radio Resource Control (RRC), the at least one user device to ignore the monitored PDCCH pattern for a predetermined time.

In accordance with the example embodiments as described in the paragraphs above, wherein PDCCH for at least one of downlink and uplink allocation includes an indicator to ignore the monitored PDCCH pattern.

In accordance with the example embodiments as described in the paragraphs above, wherein, for a downlink allocation, information is carried in medium access control (MAC) control element (CE).

In accordance with the example embodiments as described in the paragraphs above, providing, via PDCCH DCI, temporary spatial quasi co-locator (QCL) mapping between downlink reference signals (DL RSs) and Demodulation Reference Signal (DMRS) of PDCCH of particular time instant overriding a higher layer configured spatial QCL mapping for a particular period of time.

In accordance with the example embodiments as described in the paragraphs above, wherein the temporary spatial QCL mapping is provided for at least one of both downlink and uplink allocation, and downlink control information (DCI) without data channel allocation.

In accordance with the example embodiments as described in the paragraphs above, associating ignoring the monitored PDCCH pattern due to UL allocations to a buffer status report of the at least one user device, wherein the at least one base station is configured to ignore based on an amount of data in a buffer of the at least one user device exceeding a predetermined threshold.

An example embodiment may be provided in an apparatus comprising at least one processor; and at least one non-transitory memory including computer program code, the at least one memory and the computer program code may be configured to, with the at least one processor, cause the apparatus to: transmit Physical Downlink Control Channel (PDCCH) via a primary BPL within n slots, wherein n is a time between the transmission of Physical Uplink Control Channel (PUCCH) carrying Hybrid Automatic Repeat Request (HARQ) information corresponding to PDCCH transmitted via a primary beam and a next time instance that PDCCH is configured be monitored from a secondary beam, receive HARQ feedback within m slots calculated from a slot number configured to monitor PDCCH on at least one secondary BPL, wherein m is time between a scheduled PDCCH and a next NR-PDCCH monitoring instance via secondary beam, and in response to receiving the HARQ feedback, ignore a monitored PDCCH pattern and schedule at least one user device using the primary BPL on the slot number configured to monitor NR-PDCCH on the at least one secondary BPL In accordance with the example embodiments as described in the paragraphs above, transmit PDCCH via the primary BPL to schedule PUSCH within p slots, transmit HARQ feedback within r slots calculated from a slot number configured to monitor PDCCH on the at least one secondary BPL; and in response to transmitting the HARQ feedback, ignore the monitored PDCCH pattern and transmit PDCCH to the at least one user device using the primary BPL on the slot number configured to monitor PDCCH on the at least one secondary BPL.

In accordance with the example embodiments as described in the paragraphs above, configure, via an indictor transmitted by Radio Resource Control (RRC), the at least one user device to ignore the monitored PDCCH pattern for a predetermined time.

In accordance with the example embodiments as described in the paragraphs above, wherein the indictor comes into effect when the HARQ feedback is transmitted.

In accordance with the example embodiments as described in the paragraphs above, wherein PDCCH for at least one of downlink and uplink allocation includes an indicator to ignore the monitored PDCCH pattern.

In accordance with the example embodiments as described in the paragraphs above, wherein, for a downlink allocation, information is carried in medium access control (MAC) control element (CE).

An example embodiment may provide a method comprising detecting New radio Physical Downlink Control Channel (NR-PDCCH) and calculate n as a time between a current slot and a next slot configured for monitoring PDCCH from a secondary beam, calculating m as time between a slot where Physical Uplink Control Channel (PUCCH) is to be transmitted and the next slot configured for monitoring PDCCH from the secondary beam; and determining whether both m≤M and n≤N and if both conditions hold, monitor NR-PDCCH based on an assumption that a same beam used for detected NR-PDCCH is also in the next slot configured for monitoring PDCCH from the secondary beam, wherein M is a maximum time between transmission of the NR-PDCCH transmitted via a primary beam and a next time instance the NR-PDCCH is to be monitored from the secondary beam and N is a maximum time between transmission of UL PUCCH carrying Hybrid Automatic Repeat Request (HARQ) acknowledgment/non-acknowledgment (ACK/NACK) corresponding to the NR-PDCCH transmitted via the primary beam and the next time instance the NR-PDCCH is to be monitored from the secondary beam.

An example embodiment may be provided in an apparatus comprising at least one processor; and at least one non-transitory memory including computer program code, the at least one memory and the computer program code may be configured to, with the at least one processor, cause the apparatus to: detect New radio Physical Downlink Control Channel (NR-PDCCH) and calculate n as a time between a current slot and a next slot configured for monitoring PDCCH from a secondary beam; calculate m as time between a slot where Physical Uplink Control Channel (PUCCH) is to be transmitted and the next slot configured for monitoring PDCCH from the secondary beam; and determine whether both m≤M and n≤N and if both conditions hold, monitor NR-PDCCH based on an assumption that a same beam used for detected NR-PDCCH is also in the next slot configured for monitoring PDCCH from the secondary beam, wherein M is a maximum time between transmission of the NR-PDCCH transmitted via a primary beam and a next time instance the NR-PDCCH is to be monitored from the secondary beam and N is a maximum time between transmission of UL PUCCH carrying Hybrid Automatic Repeat Request (HARQ) acknowledgment/non-acknowledgment (ACK/NACK) corresponding to the NR-PDCCH transmitted via the primary beam and the next time instance the NR-PDCCH is to be monitored from the secondary beam.

In accordance with another example, an example apparatus comprises: means for transmitting, by the base station, PDCCH via the primary BPL to schedule PUSCH within p slots, means for transmitting HARQ feedback within r slots calculated from a slot number configured to monitor PDCCH on the at least one secondary BPL; and in response to transmitting the HARQ feedback, means for ignoring the monitored PDCCH pattern and transmitting PDCCH to the at least one user device using the primary BPL on the slot number configured to monitor PDCCH on the at least one secondary BPL.

In accordance with another example, an example apparatus comprises: means for transmitting, by a base station, Physical Downlink Control Channel (PDCCH) via a primary BPL within n slots, wherein n is a time between the transmission of Physical Uplink Control Channel (PUCCH) carrying Hybrid Automatic Repeat Request (HARQ) information corresponding to PDCCH transmitted via a primary beam and a next time instance that PDCCH is configured be monitored from a secondary beam, means for receiving HARQ feedback within m slots calculated from a slot number configured to monitor PDCCH on at least one secondary BPL, wherein m is time between a scheduled PDCCH and a next NR-PDCCH monitoring instance via secondary beam, and in response to receiving the HARQ feedback, means for ignoring a monitored PDCCH pattern and scheduling at least one user device using the primary BPL on the slot number configured to monitor NR-PDCCH on the at least one secondary BPL.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above.

It is also noted herein that while the above describes example embodiments, these descriptions should not be viewed in a limiting sense. Rather, there are several variations and modifications which may be made without departing from the scope of the present invention.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications which may be made without departing from the scope of the present invention as defined in the appended claims.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of example and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method, comprising:

transmitting, by a base station, a first downlink channel via a primary beam within n slots, wherein n is a time between the transmission of an uplink control channel carrying Hybrid Automatic Repeat Request (HARQ) information corresponding to the first downlink channel transmitted via the primary beam and a next time instance that a second downlink channel is configured be monitored from a secondary beam;

receiving HARQ feedback within m slots calculated from a slot number configured to monitor the second downlink channel on at least one secondary beam, wherein m is time between a scheduled downlink channel and a next downlink channel monitoring instance via the secondary beam; and in response to receiving the HARQ feedback, ignoring a monitored downlink channel pattern and scheduling at least one user device using the primary beam on the slot number configured to monitor the second downlink channel on the at least one secondary beam.

2. The method of claim 1, wherein the transmitting comprises one of a new transmission and a retransmission.

3. The method of claim 1, further comprising:
transmitting, by the base station, the downlink channel via the primary beam to schedule the uplink channel within p slots, wherein p is a time between downlink channel scheduling the uplink channel and a next downlink channel monitoring instance via the secondary beam;
transmitting HARQ feedback within r slots calculated from a slot number configured to monitor the second downlink channel on the at least one secondary beam, wherein r is a time between transmission of downlink channel HARQ ACK/NACK for allocated uplink channel and a next time instance the downlink channel is configured to be monitored from the at least one secondary beam; and
in response to transmitting the HARQ feedback, ignoring the monitored downlink channel pattern and transmitting the downlink channel to the at least one user device using the primary beam on the slot number configured to monitor the downlink channel on the at least one secondary beam.

4. The method of claim 1, further comprising:
configuring, via an indictor transmitted by Radio Resource Control (RRC), the at least one user device to ignore the monitored downlink channel pattern for a predetermined time.

5. The method of claim 4, wherein the indictor comes into effect when the HARQ feedback is transmitted.

6. The method of claim 1, wherein the downlink channel for at least one of downlink and uplink allocation includes an indicator to ignore the monitored downlink channel pattern.

7. The method of claim 1, wherein, for a downlink allocation, information is carried in medium access control (MAC) control element (CE).

8. The method of claim 1, further comprising:
providing, via downlink channel information (DCI), temporary spatial quasi co-locator (QCL) mapping between downlink reference signals (DL RSs) and Demodulation Reference Signal (DMRS) of downlink channel of particular time instant overriding a higher layer configured spatial QCL mapping for a particular period of time.

9. The method of claim 8, wherein the temporary spatial QCL mapping is provided for at least one of both downlink and uplink allocation, and DCI without data channel allocation.

10. The method of claim 1, further comprising:
associating ignoring the monitored downlink channel pattern due to UL allocations to a buffer status report of the at least one user device, wherein the at least one base station is configured to ignore based on an amount of data in a buffer of the at least one user device exceeding a predetermined threshold.

11. The method of claim 1, wherein the downlink channel comprises a New radio Physical Downlink Control Channel (NR-PDCCH), the uplink control channel comprises a New radio Physical Uplink Control Channel (NR-PUCCH) and the primary beam comprises a primary beam pair link (BPL) and the second beam comprises a second BPL.

12. An apparatus, comprising:
at least one processor; and
at least one non-transitory memory including computer program code,
the at least one non-transitory memory and the computer program code configured to, with the at least one processor, cause the apparatus to:
transmit a first downlink channel via a primary beam within n slots, wherein n is a time between the transmission of an uplink control channel carrying Hybrid Automatic Repeat Request (HARQ) information corresponding to the first downlink channel transmitted via the primary beam and a next time instance that a second downlink channel is configured be monitored from a secondary beam;
receive HARQ feedback within m slots calculated from a slot number configured to monitor the second downlink channel on at least one secondary beam, wherein m is time between a scheduled downlink channel and a next downlink channel monitoring instance via the secondary beam; and
in response to receiving the HARQ feedback, ignore a monitored downlink channel pattern and schedule at least one user device using the primary beam on the slot number configured to monitor the second downlink channel on the at least one secondary beam.

13. The apparatus of claim 12, where the at least one non-transitory memory and the computer program code are further configured to, with the at least one processor, cause the apparatus to:
transmit the first downlink channel via the downlink channel to schedule the uplink channel within p slots, wherein p is a time between downlink channel scheduling the uplink channel and a next downlink channel monitoring instance via the secondary beam;
transmit HARQ feedback within r slots calculated from a slot number configured to monitor the second downlink channel on the at least one secondary beam, wherein r is a time between transmission of downlink channel HARQ ACK/NACK for allocated uplink channel and a next time instance the downlink channel is configured to be monitored from the at least one secondary beam; and
in response to transmitting the HARQ feedback, ignore the monitored downlink channel pattern and transmit the downlink channel to the at least one user device using the primary beam on the slot number configured to monitor the downlink channel on the at least one secondary beam.

14. The apparatus of claim 12, where the at least one non-transitory memory and the computer program code are further configured to, with the at least one processor, cause the apparatus to:
configure, via an indictor transmitted by Radio Resource Control (RRC), the at least one user device to ignore the monitored downlink channel pattern for a predetermined time.

15. The apparatus of claim 14, wherein the indictor comes into effect when the HARQ feedback is transmitted.

16. The apparatus of claim 12, wherein the downlink channel for at least one of downlink and uplink allocation includes an indicator to ignore the monitored downlink channel pattern.

17. The apparatus of claim 12, wherein, for a downlink allocation, information is carried in medium access control (MAC) control element (CE).

18. The apparatus of claim 12, where the at least one non-transitory memory and the computer program code are further configured to, with the at least one processor, cause the apparatus to:
provide, via downlink channel information (DCI), temporary spatial quasi co-locator (QCL) mapping between downlink reference signals (DL RSs) and Demodulation Reference Signal (DMRS) of downlink channel of particular time instant overriding a higher layer configured spatial QCL mapping for a particular period of time.

19. The apparatus of claim 12, wherein the downlink channel comprises a New radio Physical Downlink Control Channel (NR-PDCCH), the uplink control channel comprises a New radio Physical Uplink Control Channel (NR-PUCCH) and the primary beam comprises a primary beam pair link (BPL) and the second beam comprises a second BPL.

20. An apparatus, comprising:

at least one processor; and at least one memory including computer program code, the at least one memory and the computer program code configured to, with the at least one processor, cause the apparatus to perform at least the following:

detect a first downlink channel and calculate n as a time between a current slot and a next slot configured for monitoring a second downlink channel from a secondary beam;

calculate m as time between a slot where an uplink channel is to be transmitted and the next slot configured for monitoring the second downlink channel from the secondary beam; and determine whether both m less than or equal to M and n is less than or equal to N and if both conditions hold, monitor the first downlink channel based on an assumption that a same beam used for the detected first downlink channel is also in the next slot configured for monitoring the second downlink channel from the secondary beam, wherein M is a maximum time between transmission of the first downlink channel transmitted via a primary beam and a next time instance the second downlink channel is to be monitored from the secondary beam and N is a maximum time between transmission of the uplink channel carrying Hybrid Automatic Repeat Request (HARQ) acknowledgment/non-acknowledgment (ACK/NACK) corresponding to the first downlink channel transmitted via the primary beam and the next time instance the second downlink channel is to be monitored from the secondary beam.

* * * * *

UNITED STATES PATENT AND TRADEMARK OFFICE

CERTIFICATE OF CORRECTION

PATENT NO. : 10,666,400 B2
APPLICATION NO. : 16/125134
DATED : May 26, 2020
INVENTOR(S) : Jorma Kaikkonen et al.

It is certified that error appears in the above-identified patent and that said Letters Patent is hereby corrected as shown below:

In the Claims

At Column 19, Claim number 20, Line number 18 should read:
"detect a first downlink channel and calculate m as a time"

At Column 20, Claim number 20, Line number 1 should read:
"calculate n as time between a slot where an uplink"

Signed and Sealed this
Twenty-ninth Day of July, 2025

Coke Morgan Stewart
*Acting Director of the United States Patent and Trademark Office*